(12) United States Patent
Winter

(10) Patent No.: US 7,963,743 B1
(45) Date of Patent: Jun. 21, 2011

(54) WIND TURBINE WITH IMPROVED COOLING

(76) Inventor: Curt B. Winter, Franklin, WI (US)

( * ) Notice: Subject to any disclaimer, the term of this patent is extended or adjusted under 35 U.S.C. 154(b) by 0 days.

(21) Appl. No.: 12/906,078

(22) Filed: Oct. 16, 2010

(51) Int. Cl.
*F03B 15/06* (2006.01)

(52) U.S. Cl. .......... 415/178; 415/908; 415/4.5; 415/220

(58) Field of Classification Search .................. 415/175, 415/176, 177, 178, 121.3, 220, 232, 905, 415/908, 2.1, 4.1, 4.2, 4.3, 4.4, 4.5; 290/44, 290/55; 165/104.19, 132, 80.4, 185; 310/54, 310/64, 89

See application file for complete search history.

(56) References Cited

U.S. PATENT DOCUMENTS

| | | | |
|---|---|---|---|
| 5,894,884 A | 4/1999 | Durian et al. | |
| 6,050,329 A * | 4/2000 | Durian et al. | 165/132 |
| 6,520,737 B1 * | 2/2003 | Fischer et al. | 415/4.3 |
| 6,676,122 B1 | 1/2004 | Wobben | |
| 7,057,305 B2 | 6/2006 | Kruger-Gotzmann et al. | |
| 7,161,260 B2 | 1/2007 | Kruger-Gotzmann et al. | |
| 7,168,251 B1 | 1/2007 | Janssen | |
| 7,345,376 B2 | 3/2008 | Costin | |
| 7,427,814 B2 | 9/2008 | Bagepalli et al. | |
| 7,621,720 B2 * | 11/2009 | Nies | 416/1 |
| 7,719,129 B2 * | 5/2010 | Hahlbeck | 290/55 |
| 7,748,946 B2 | 7/2010 | Wan | |
| 2001/0032718 A1 * | 10/2001 | Sheerin et al. | 165/130 |
| 2006/0113804 A1 * | 6/2006 | Costin | 290/55 |
| 2010/0008776 A1 | 1/2010 | Larsen et al. | |
| 2010/0061853 A1 * | 3/2010 | Bagepalli | 416/95 |
| 2010/0127502 A1 | 5/2010 | Uchino et al. | |
| 2010/0133824 A1 | 6/2010 | Gao | |
| 2010/0140952 A1 | 6/2010 | Jansen | |
| 2010/0164228 A1 | 7/2010 | Matsuo et al. | |

FOREIGN PATENT DOCUMENTS

| | | |
|---|---|---|
| EP | 2163761 | 3/2010 |
| EP | 2213877 | 8/2010 |
| WO | WO2008/102184 | 8/2008 |
| WO | WO2009/115100 | 9/2009 |
| WO | WO2010/024650 | 9/2009 |
| WO | WO2010/010442 | 1/2010 |

* cited by examiner

*Primary Examiner* — Ninh H Nguyen
*Assistant Examiner* — Andrew Knopp
(74) *Attorney, Agent, or Firm* — Donald J. Ersler (57) ABSTRACT

A wind turbine with improved cooling, which provides liquid cooling for a wind turbine with a completely closed or at least partially closed cooling circuit, with which the heat to be dissipated from the cooling circuit is dissipated by a nacelle of the wind turbine. The wind turbine with improved cooling dissipates energy losses from heat and applied for the conversion of kinetic energy of wind into mechanical and electrical energy of the wind turbine.

14 Claims, 7 Drawing Sheets

WIND TURBINE WITH IMPROVED COOLING

BACKGROUND OF THE INVENTION

1. Field of the Invention

The present invention relates generally to wind turbines and more specifically to a wind turbine with improved cooling, which provides improved cooling for components of the wind turbine.

2. Discussion of the Prior Art

Most wind turbines use heat transfer devices, such as fans to dissipate heat into the environment. In this way, cold air is suctioned in from the outside by the fans to cool wind turbine components such as the generator. The heated air is then blown back outside. Some wind turbines transfer component heat within a nacelle to a heat exchanger mounted external on the nacelle for atmosphere environment air to pass through and transfer the heat.

All of these known solutions have in common a large amount of air that is always needed from the outside. This is particularly disadvantageous if the outside air is humid or, particularly in coastal regions, if it has a high salt content, and the cooling elements are then exposed to this humid and high salt content air. This problem is especially extreme with wind energy facilities that stand directly on a coast or, in offshore technology, directly in salt water. Another problem is the environmental contamination of air heat exchanges being clogged and blocked.

Accordingly, there is a clearly felt need in the art for a wind turbine with improved cooling, which provides improved cooling for components of the wind turbine without the cooling elements being damaged by the effects of humid and/or salty air.

SUMMARY OF THE INVENTION

The present invention provides a wind turbine with improved cooling, which provides improved cooling for components of the wind turbine. One object of the invention is to provide a cooling device for a wind turbine. The basic concept of the invention is to provide a completely closed or in an alternative embodiment, a partially closed cooling circuit for a wind turbine, so that no or practically no outside air has to be used for cooling through the inside of the wind turbine. In this way, the liquid cooling media circulates within the wind turbine to a nacelle liquid reservoir that dissipates by conduction to an external surface and then cooled by convection of atmosphere wind. One option is to have a plurality of external cooling fins that are hollow with an inlet and exhaust ports to transfer liquid through each cooling fin. Another option is to have hollow cooling fins that allow the cooling liquid more surface area to transfer heat to the outside environment.

The cooling fluid is preferably any suitable coolant. A liquid, such as antifreeze can be used, if desired over or through wind turbine devices. A lubricating type of heat transfer oil fluid may be used to pass through the electric generator for cooling and lubrication of the generator rotor bearings. The lubricating type of oil fluid may also be used to cool and lubricate other rotating bearing systems within the wind turbine.

A cooling circuit that is contained within the nacelle and the plurality of cooling fins is thus closed and does require the introduction of cooled air from outside. For cooling all wind turbine components, particularly sensitive components, the wind turbine always uses the same air within the closed circuit. The cooling circuit is a closed system, and once sealed with the proper air, is not later opened or exposed to outside air. If necessary, air filters and additional cooling devices (e.g., heat exchangers) may also be mounted in the cooling path, if needed.

The advantages of the invention include the fact that no high salt content or humid air comes into contact with the wind turbine components, such as generators, brakes, bearings and electronics. The risk of corrosion is thus drastically reduced within the nacelle and the tower. The nacelle is a housing that contains components, such as the generator, brakes, bearing assembly, gear boxes, electronics and controls. The nacelle also includes a reservoir for retaining cooling fluid. Preferably, a plurality of internal cooling fins extend from an inner surface of the nacelle into reservoir chambers formed in the nacelle for extracting heat from the cooling liquid. Heat is transferred from the plurality of internal cooling fins to an outer surface area of the nacelle to be cooled by atmosphere wind.

In total, for the cooling of the entire wind turbine, considerably less energy is required than the prior art, because (secondary) cooling power is produced from the atmosphere outside of the nacelle by the wind.

If cooling from the plurality of external cooling fins, the plurality of internal cooling fins and passing external air is not sufficient, such as on very warm days, it is also possible to use additional cooling elements, such as conventional heat exchangers and the like in the cooling circuit.

For improving the cooling effect of the nacelle, the nacelle can be completely or partially made out of metal. It is preferable to use aluminum as the metal in order to also take advantage of the cooling effect of an outer surface area of the nacelle, which is constantly enveloped by wind, and thus to increase the wind turbine cooling. The outer surface area of the nacelle is cooled by atmospheric wind.

DETAILED DESCRIPTION OF THE PREFERRED EMBODIMENTS

Figure 1:
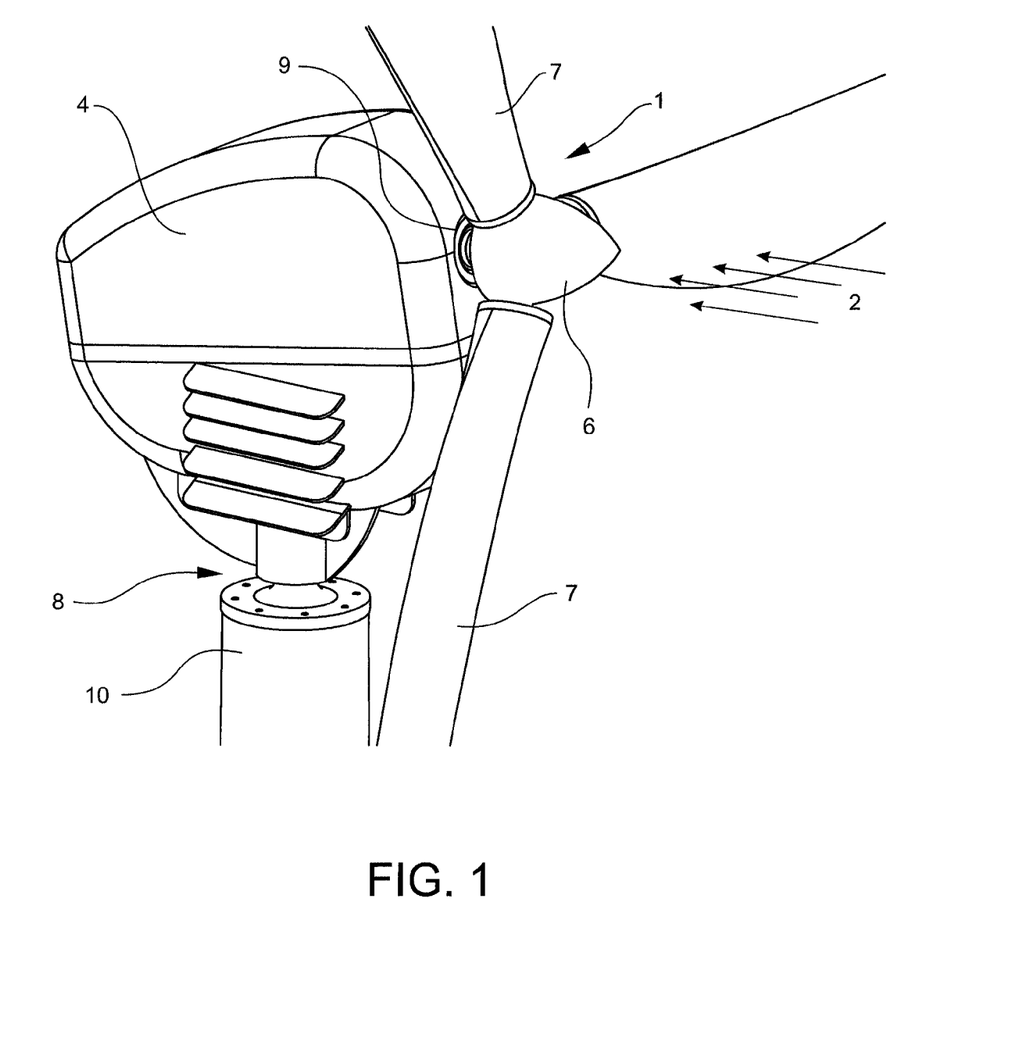
FIG. 1 is a perspective view of a wind turbine and an upper portion of a supporting tower.

With reference now to the drawings, and particularly to FIG. 1, there is shown a side view of a wind turbine 1. The wind turbine 1 preferably includes a nacelle 4, a rotor 6, a pivot system 8 and a tower 10. The nacelle 4 is pivotally retained on a top of the tower 10 with the pivot system 8. A bottom portion of the tower 10 is anchored in the ground (not shown). The nacelle 4 houses a rotor drive shaft, generator and other components of the wind turbine 1. The components found in the nacelle 4 are well known in the art and need not be shown or explained in detail. The rotor 6 extends from an end of a rotor drive shaft 9. The rotor 6 includes a plurality of blades 7 and the rotor drive shaft 9.

Figure 2:
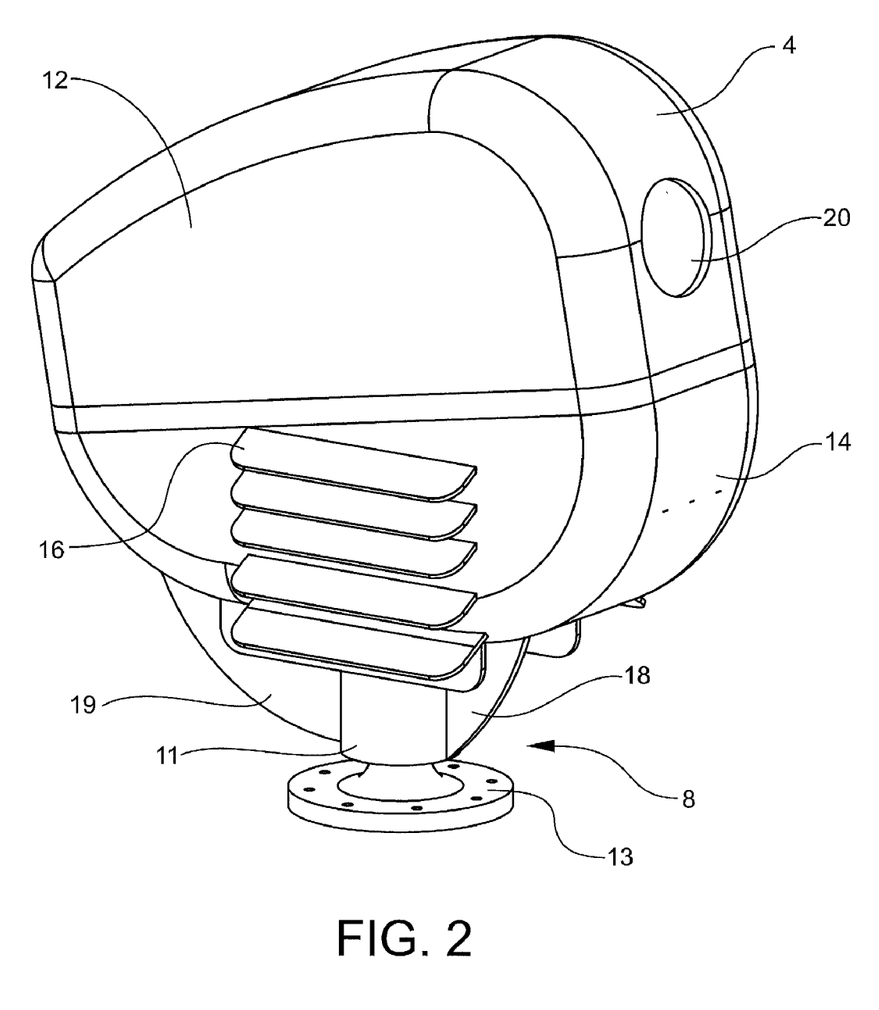
FIG. 2 is perspective view of a nacelle and a pivot system of a wind turbine.
Figure 3:
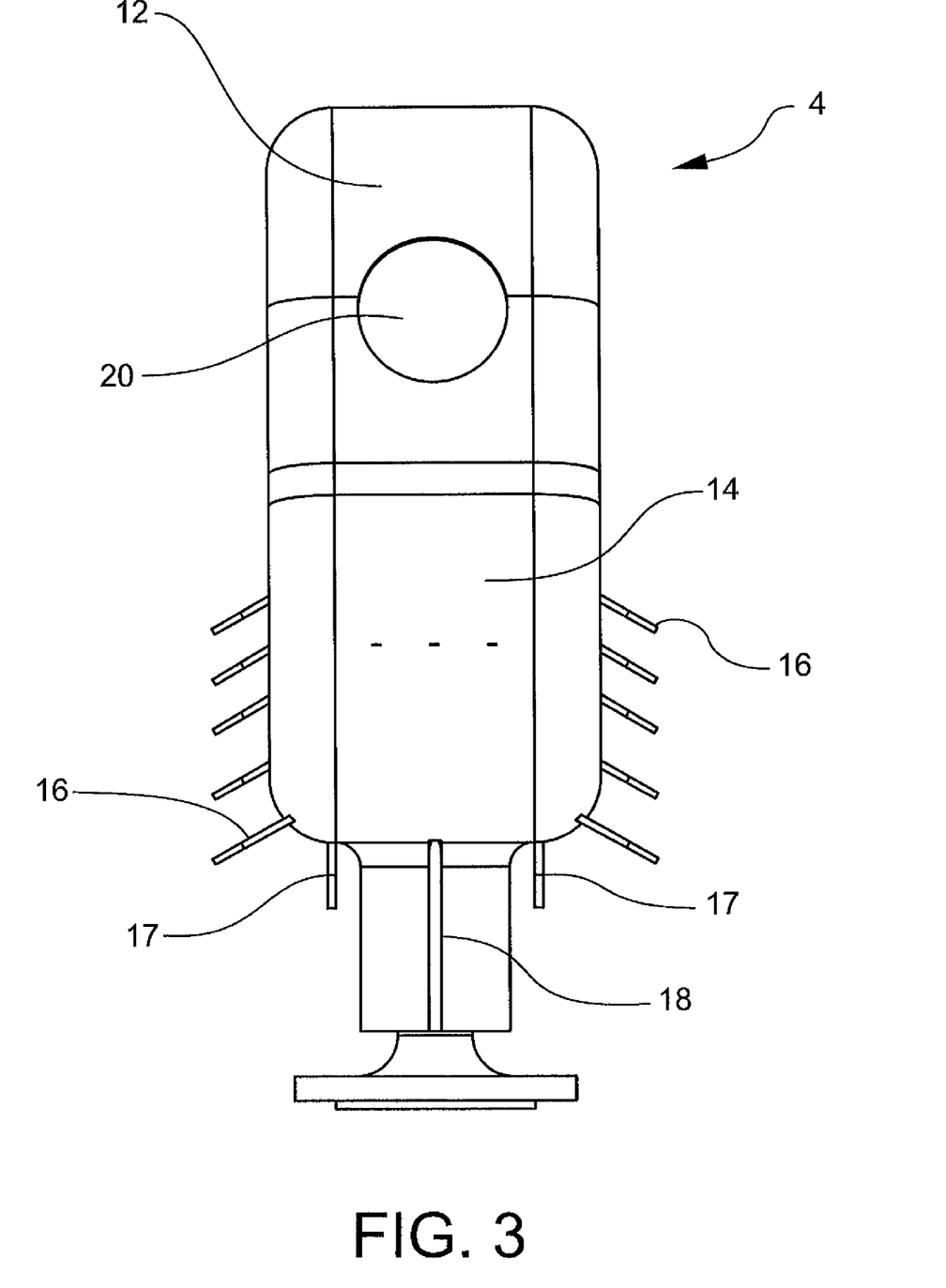
FIG. 3 is a front view of a nacelle and a pivot system of a wind turbine.

With reference to FIGS. 2-3, the nacelle 4 includes a shaft housing 12, a reservoir housing 14 and a plurality of external cooling fins 16. The shaft housing 12 may be secured to the reservoir housing 14 with any suitable method. The rotor drive shaft 9 is inserted through a drive shaft opening 20 in the shaft housing 12. The open area between the drive shaft opening 20 and the rotor drive shaft 9 is preferably sealed from the atmosphere. The sealed nacelle 4 also protects internal components from polluted air.

The plurality of external cooling fins 16 preferably extend from opposing sides of the reservoir housing 14. At least one external cooling fin 17 preferably extends from a bottom of the reservoir housing 14. The plurality of external cooling fins 16 are preferably sloped downward and are spaced apart to keep them from being contaminated by the weather and nesting birds. The external cooling fins 17 extend from a bottom of the reservoir housing 14 to gain cooling surface area and to be parallel to the desired wind air flow 2. Shapes of the plurality of external cooling fins 16, 17 shapes may be modified for thickness, taper, extension to the atmosphere, length. The number of external cooling fins 16, 17 may also be increased in number. The plurality of external cooling fins 16, 17 may be cast as an integral portion of the reservoir housing 14 or fastened to the reservoir housing 14. The shaft and reservoir housings may completely or partially fabricated from steel, aluminum or any other suitable material. It is preferably to fabricate those portions of the shaft and reservoir housings that transfer heat to the atmosphere of aluminum.

Figure 4:
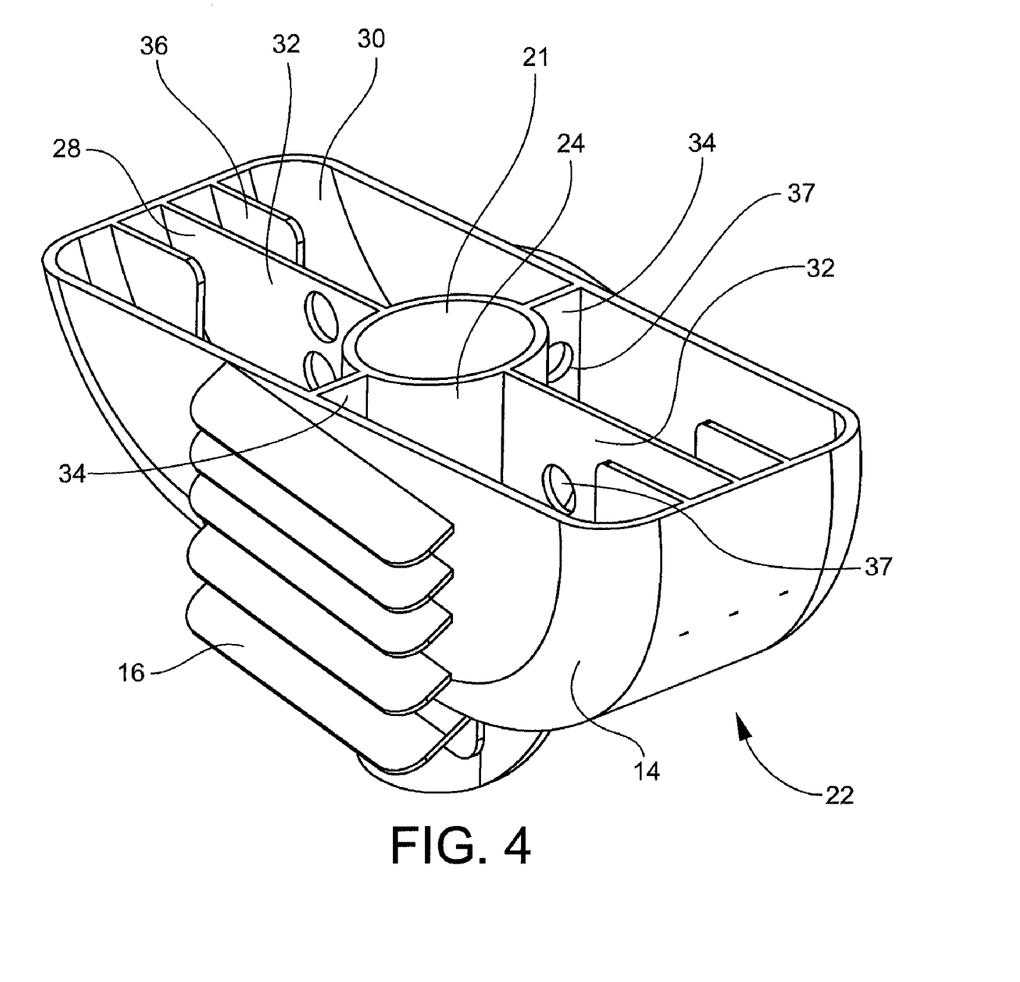
FIG. 4 is a top perspective view of an inner portion of a reservoir housing of a nacelle of a wind turbine.
Figure 5:
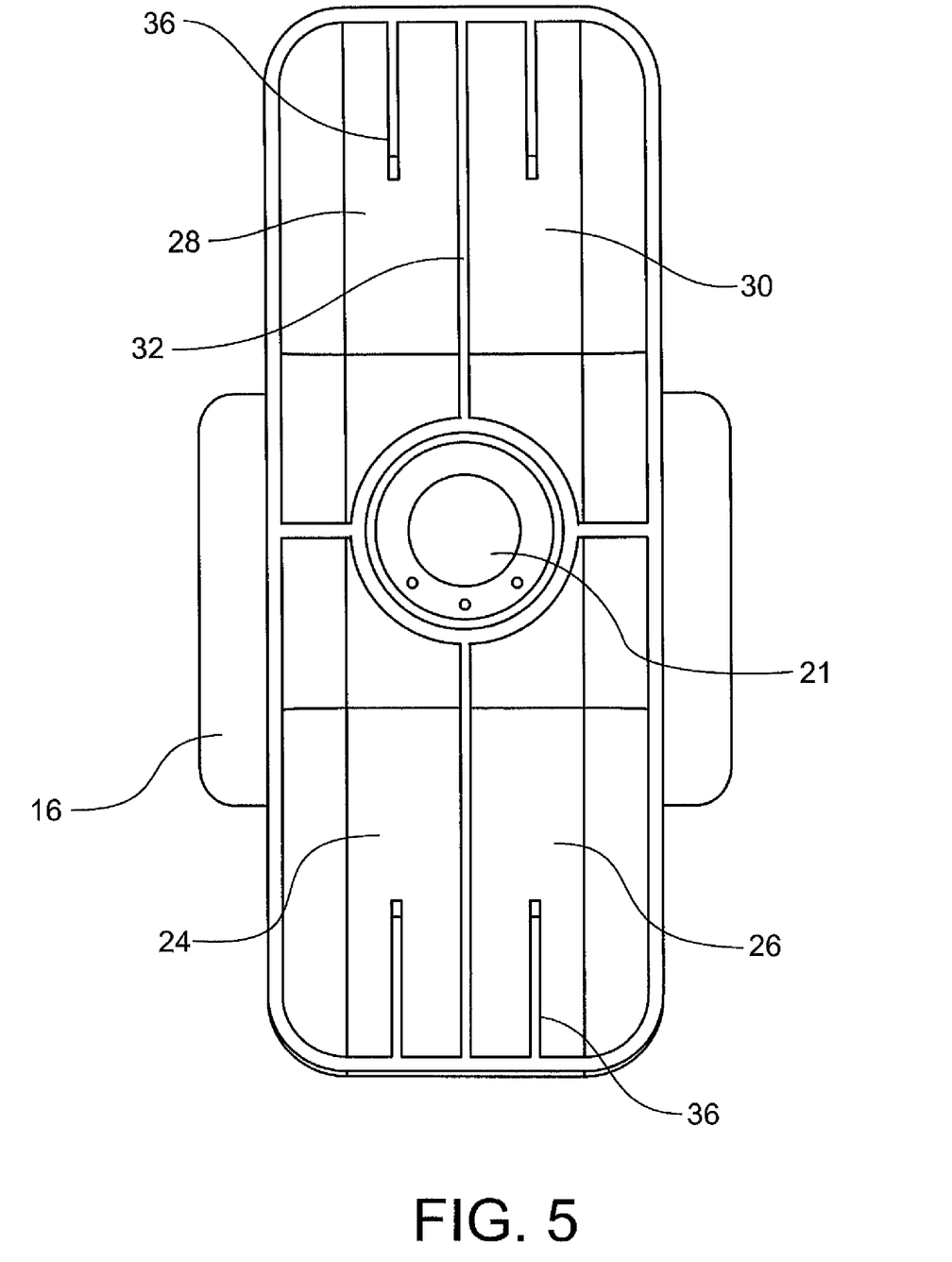
FIG. 5 is a top view of a reservoir housing of a nacelle of a wind turbine.

The pivot system 8 preferably includes a nacelle mounting base 11 and a tower mounting flange 13. The nacelle mounting base 11 extends upward from the tower mounting flange 13. Preferably, pivot cooling fins 18, 19 extend from an outside perimeter of the nacelle mounting base 11. With reference to FIGS. 4-5 the nacelle mounting base 11 is inserted into a pivot tube 21 formed in the reservoir housing 14. The pivot tube 21 is isolated from the reservoir chambers 24, 26, 28, 30 to allow pitch rotation of the wind turbine 1 into the wind air flow 2 and passage of electric feeds and other systems down the tower 10 to the foundation and ground (not shown). The reservoir chambers 24, 26, 28, 30 may be divided into at least two sub-chambers for holding more than one cooling liquid, ie: cooling oil on the port side and WEG on the starboard side.

The tower mounting flange 13 is mounted to a top of the tower 10 with a plurality of fasteners (not shown). The pivot cooling fins 18, 19 provide additional cooling for the wind turbine 1. The stern side center fin 19 preferably has a larger surface area than the bow side center fin 18. The larger surface area of the fin 19 acts as a tail fin to provide steering from side winds into the wind air flow 2.

With reference to FIGS. 4-5, an inside of the reservoir housing 14 preferably includes a first reservoir chamber 24, a second reservoir chamber 26, a third reservoir chamber 28 and a fourth reservoir chamber 30. The reservoir chambers 24, 26, 28, 30 are formed by internal bracing supports 32, 34. At least one liquid passage 37 is formed through the internal bracing supports 32, 34 to allow the flow of cooling liquid. A plurality of internal cooling fins 36 extend inward from an inner surface area of the reservoir housing 14. The plurality of internal cooling fins 36 transfer heat from a cooling liquid to an exterior surface area of the reservoir housing 14. The number of reservoir chambers may be varied as desired. The cooling liquid may be a single liquid, a mixture of two or more cooling liquids or at least two cooling liquids. The cooling liquid may be circulated through the wind turbine 1 with a pump or any other suitable device. Components contained in the nacelle 4, such as an electric generator, the rotor drive shaft 9, speed changing gearbox transmission and electronics will benefit from the cooling liquid contained in the nacelle 4.

Figure 6:
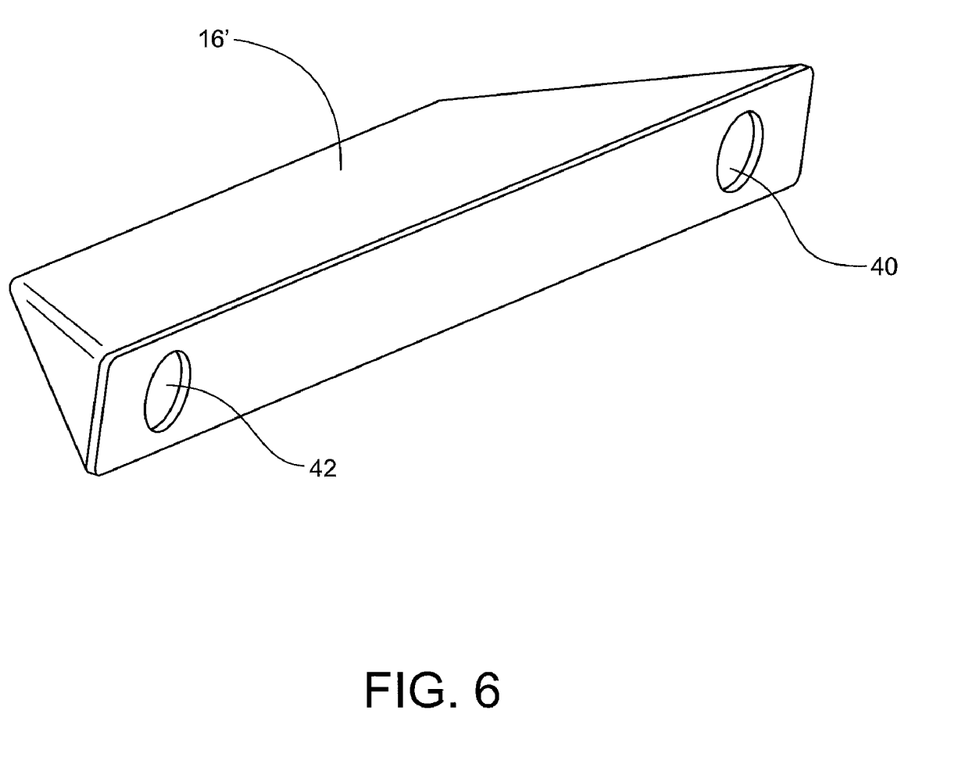
FIG. 6 is a perspective view of a hollow external cooling fin with inlet and exhaust ports for exchanging cooling fluid from a nacelle reservoir of a wind turbine.

With reference to FIG. 6, an external cooling fin 16' is shown. The external cooling fin 16' includes a hollow body, an inlet port 40 and an exhaust port 42. The inlet and outlet ports allow the transfer of a cooling liquid through the external cooling fin 16' for increased heat transfer to the atmosphere. A plurality of inlet and outlet ports would be formed through an outer surface of the reservoir housing 14, substantially concentric with the inlet and outlet ports 40, 42 to allow the flow of cooling liquid into the external cooling fin 16'.

Figure 7:
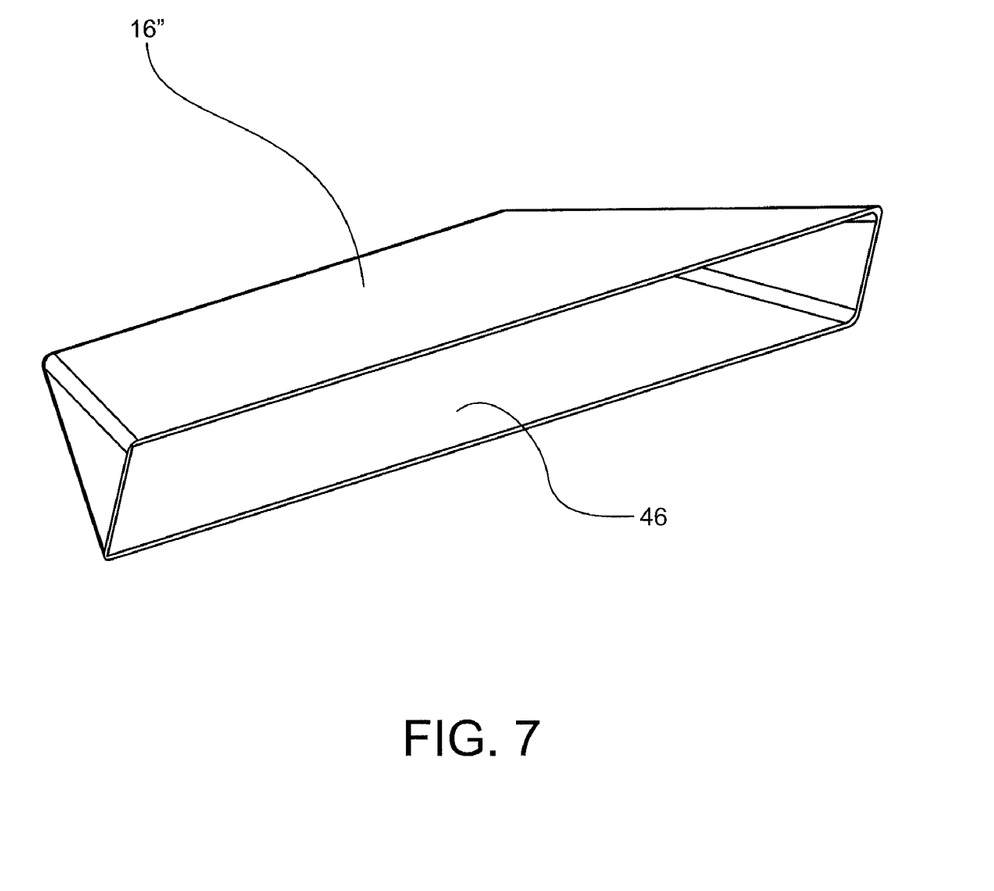
FIG. 7 is a hollow, open ended external cooling fin for receiving cooling fluid from a nacelle reservoir of a wind turbine.

With reference to FIG. 7, a hollow open-ended external cooling fin 16' is shown. A plurality of flow openings would be formed through an outer surface of the reservoir housing 14 to allow cooling liquid to flow into an open end 46 of the hollow open-ended external cooling fin 16' for increased heat transfer to the atmosphere.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A nacelle with improved cooling for a wind turbine, comprising:

a reservoir housing having an outer surface and an inner surface;

at least two reservoir chambers are formed in said inner surface, said at least two reservoir chambers are sized to receive cooling liquid, at least one liquid cooling passage for fluid communication between said at least two reservoir chambers, at least one heat generating device is contained within the nacelle of the wind turbine and being cooled by the cooling liquid within at least one of said two reservoir chambers;

a plurality of exterior cooling fins extending from said outer surface, each one of said plurality of exterior cooling fins including a hollow body, an inlet port and exhaust port; and a means for pumping cooling liquid from at least one of said at least two reservoir chambers into said inlet ports of said plurality of exterior cooling fins, said cooling liquid exiting said exhaust port into at least one of said at least two reservoir chambers, wherein ambient air passing over said plurality of exterior cooling fins reduces a temperature of the cooling liquid.

2. The nacelle with improved cooling for a wind turbine of claim 1, further comprising:

a plurality of inner cooling fins extending inward from said inner surface into said at least two reservoir chambers.

3. The nacelle with improved cooling for a wind turbine of claim 1, further comprising:

a pivot system is secured to a bottom of said reservoir housing, said pivoting system including a nacelle mounting base, at least one cooling fin extending from an outside perimeter of said nacelle mounting base.

4. The nacelle with improved cooling for a wind turbine of claim 1, further comprising:

a top of said reservoir housing is covered with a shaft housing, said rotor drive shaft is rotatably retained in said shaft housing.

5. The nacelle with improved cooling for a wind turbine of claim 1, further comprising:
   said reservoir housing is fabricated from an aluminum material.

6. A nacelle with improved cooling for a wind turbine, comprising:
   a reservoir housing having an outer surface and an inner surface;
   at least two reservoir chambers are formed in said inner surface, said at least two reservoir chambers are sized to receive cooling liquid, at least one liquid cooling passage for fluid communication between said at least two reservoir chambers, at least one heat generating device is contained within the nacelle of the wind turbine and being cooled by the cooling liquid within at least one of said two reservoir chambers;
   an exterior front cooling fin extending from a bottom of said outer surface and a front of a pivot tube, a rear exterior cooling fin extending from said bottom of said outer surface and a rear of said pivot tube, each of said front and rear cooling fins including a hollow body, an inlet port and exhaust port, said rear exterior cooling fin having a larger surface area than said front exterior cooling fin; and
   a means for pumping cooling liquid from at least one of said at least two reservoir chambers into said inlet ports of said front and rear exterior cooling fins, said cooling liquid exiting said exhaust port into at least one of said at least two reservoir chambers, wherein ambient air passing over said plurality of exterior cooling fins reduces a temperature of the cooling liquid, said rear exterior cooling fin acting as a tail for steering the wind turbine from side winds.

7. The nacelle with improved cooling for a wind turbine of claim 6, further comprising:
   a plurality of inner cooling fins extending inward from said inner surface into said at least two reservoir chambers.

8. The nacelle with improved cooling for a wind turbine of claim 6, further comprising:
   a pivot system is secured to a bottom of said reservoir housing, said pivoting system including a nacelle mounting base, at least one cooling fin extending from an outside perimeter of said nacelle mounting base.

9. The nacelle with improved cooling for a wind turbine of claim 6, further comprising:
   a top of said reservoir housing is covered with a shaft housing, said rotor drive shaft is rotatably retained in said shaft housing.

10. The nacelle with improved cooling for a wind turbine of claim 6, further comprising:
    said reservoir housing is fabricated from an aluminum material.

11. A nacelle with improved cooling for a wind turbine, comprising: a reservoir housing having an outer surface and an inner surface, said outer surface having a front, a left side, a right side and a bottom;
    at least one reservoir chamber is formed in said inner surface, said at least one reservoir chamber is sized to receive cooling liquid, at least one heat generating device is contained within the nacelle of the wind turbine and being cooled by the cooling liquid within said at least one reservoir chamber;
    a plurality of exterior cooling fins extending from said left side and said right side of said outer surface, each one of said plurality of exterior cooling fins including a hollow body, an inlet port and exhaust port; and
    a means for pumping cooling liquid from said at least one reservoir chamber into said inlet ports of said plurality of exterior cooling fins, said cooling liquid exiting said exhaust port into said at least one reservoir chamber, wherein ambient air passing over said plurality of exterior cooling fins reduces a temperature of the cooling liquid.

12. The nacelle with improved cooling for a wind turbine of claim 11, further comprising:
    a pivot system is secured to a bottom of said reservoir housing, said pivoting system including a nacelle mounting base, at least one cooling fin extending from an outside perimeter of said nacelle mounting base.

13. The nacelle with improved cooling for a wind turbine of claim 11, further comprising:
    a top of said reservoir housing is covered with a shaft housing, said rotor drive shaft is rotatably retained in said shaft housing.

14. The nacelle with improved cooling for a wind turbine of claim 11, further comprising:
    said reservoir housing is fabricated from an aluminum material.

* * * * *